US012776909B1

(12) United States Patent
Verhelle et al.

(10) Patent No.: US 12,776,909 B1
(45) Date of Patent: Oct. 27, 2026

(54) SYSTEMS AND METHODS FOR SECURE MULTI-PARTY COMPUTATION OF DATA RECORDS

(71) Applicant: Veeva Systems Inc., Pleasanton, CA (US)

(72) Inventors: Kristyn M. Verhelle, Livonia, MI (US); Mark Vidov, Toronto (CA); Julie Scuffins, Boyds, MD (US); Christopher McDermott, Kitchener (CA); Nikhil Vasandani, Toronto (CA); Bruce Ritchie, Newmarket (CA); Asaf Evenhaim, New York, NY (US); Lindsey Lofgren Doyle, New York, NY (US)

(73) Assignee: Veeva Systems Inc., Pleasanton, CA (US)

( * ) Notice: Subject to any disclaimer, the term of this patent is extended or adjusted under 35 U.S.C. 154(b) by 20 days.

(21) Appl. No.: 18/820,641

(22) Filed: Aug. 30, 2024

(51) Int. Cl.
*G06F 17/00* (2019.01)
*G06F 7/00* (2006.01)
*H04L 9/00* (2022.01)
*H04L 9/32* (2006.01)

(52) U.S. Cl.
CPC ............ *H04L 9/3213* (2013.01); *H04L 9/008* (2013.01); *H04L 2209/46* (2013.01)

(58) Field of Classification Search
CPC .... H04L 9/3213; H04L 9/008; H04L 2209/46
USPC ........................................................... 707/718
See application file for complete search history.

(56) References Cited

U.S. PATENT DOCUMENTS 11,620,673 B1 * 4/2023 Paquette ............ G06Q 30/0242 705/14.41
2007/0255951 A1 * 11/2007 Grynberg ............. H04L 9/3234 713/168
2021/0314140 A1 * 10/2021 Stephenson ......... G06F 16/2379
2023/0409746 A1 * 12/2023 Paquette ............... G06F 21/602
2024/0154792 A1 * 5/2024 Das .......................... H04L 9/008
2024/0281798 A1 * 8/2024 Lindell ..................... H04L 9/50
2025/0219836 A1 * 7/2025 Cho ...................... H04L 9/0863

* cited by examiner

*Primary Examiner* — Pavan Mamillapalli

(57) ABSTRACT

A method for querying one or more data records of a combined data repository includes receiving a set of raw data records. Each data record of the set includes a deidentified token. The method includes cleaning the set of raw data records and modifying each data record of the set of raw data records to replace the deidentified token with an SMC token. The method includes generating a copy of a second data repository including multiple master data records. The method includes matching the master data records of the copy with the set of modified data records and storing the set of modified data records and the matched master data records in the combined data repository. The method includes receiving and executing a query on the combined data repository to select at least one data record. The method includes generating a file including the selected data record.

20 Claims, 4 Drawing Sheets

300

SYSTEMS AND METHODS FOR SECURE MULTI-PARTY COMPUTATION OF DATA RECORDS

TECHNICAL FIELD

The present disclosure relates to systems and methods for secure multi-party computation of data records.

BACKGROUND

Researchers, scientists, industry players, academics, government regulators, and other stakeholders are increasingly in need of ways to perform computations (i.e., match and group) on secure data records.

SUMMARY

One embodiment relates to a method for querying one or more data records of a combined data repository. The method includes receiving a set of raw data records and storing the set in a first repository. Each data record of the set of raw data records include a deidentified token. The method includes cleaning the set of raw data records. The method further includes modifying each data record of the set of raw data records to replace the deidentified token with a Secure Multi-Party Computation (SMC) token. The method further includes generating a copy of a second data repository including multiple master data records. The method further includes matching the master data records of the copy of the second data repository with the set of modified data records to determine one or more matched master data records. The method further includes storing the set of modified data records and the one or more matched master data records in the combined data repository. The method includes receiving a query including a configuration property and executing the query on the combined data repository to select at least one data record stored in the combined data repository that matches the configuration property. The method includes generating an electronic file including the selected at least one data record. The method includes outputting the electronic file.

Another embodiment relates to a method for querying one or more data records of a combined data repository. The method includes receiving a first and a second set of raw data records and storing the sets in a first repository. Each data record of the first set and the second set of raw data records include a deidentified token. The method includes cleaning the first and second set of raw data records. The method further includes outputting the cleaned first set and the cleaned second set. The method further includes receiving a modified first set of raw data records. Each data record of the modified first set of raw data records includes a Secure Multi-Party Computation (SMC) token in place of the deidentified token. The method further includes receiving a modified second set of raw data records. Each data record of the modified second set of raw data records includes a Secure Multi-Party Computation (SMC) token in place of the deidentified token. The method further includes generating a copy of a second data repository including multiple master data records. The method further matching the master data records of the copy of the second data repository with the first and second set of modified data records to determine one or more matched master data records. The method further includes storing the first set of modified data records, the second set of modified data records, and the one or more matched master data records in the combined data repository. The method includes receiving a query including a configuration property and executing the query on the combined data repository to select at least one data record stored in the combined data repository that matches the configuration property. The method includes generating an electronic file including the selected at least one data record. The method includes outputting the electronic file.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
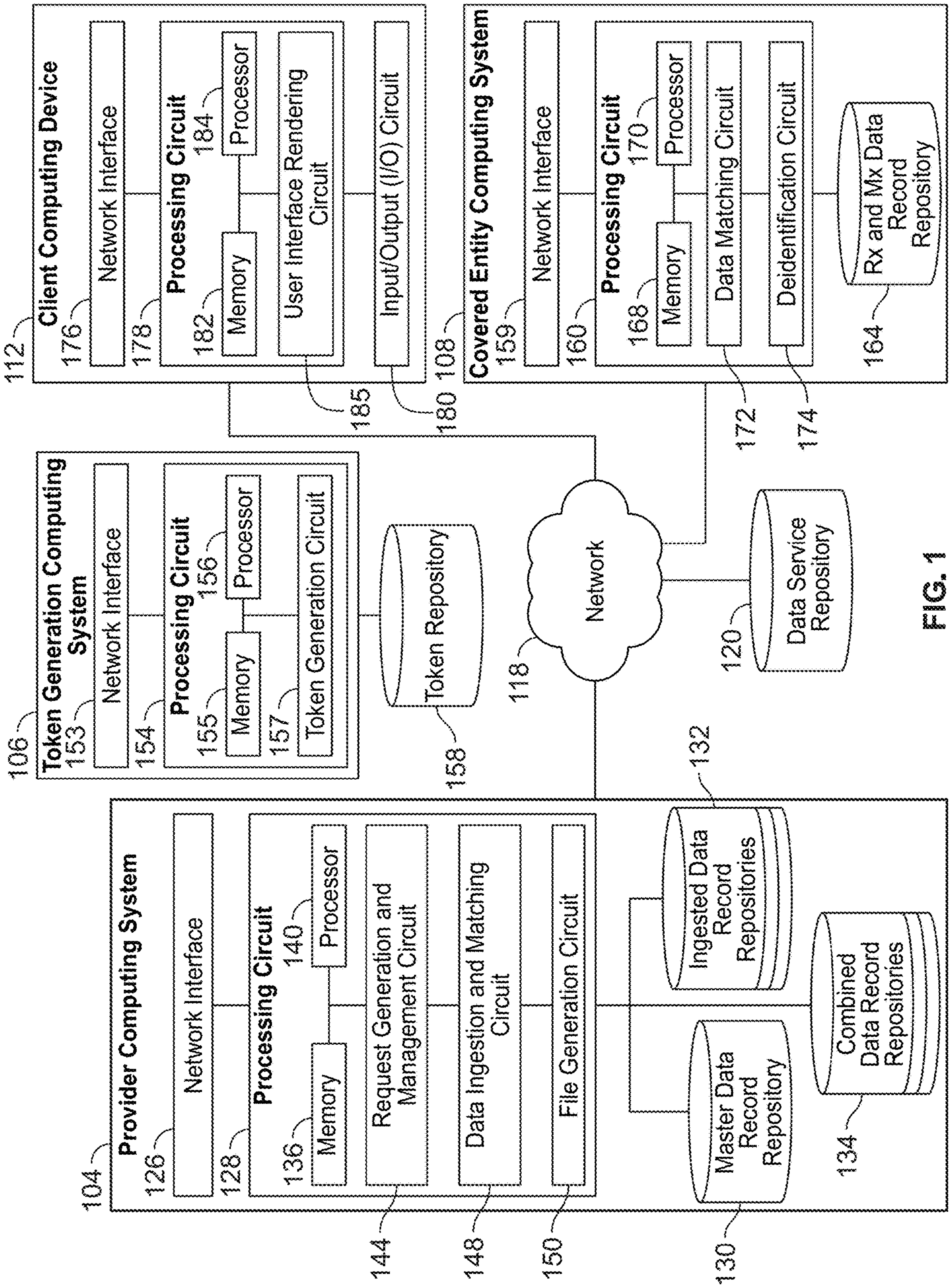
FIG. 1 is a component diagram of a secure multi-party computation (SMC) data record system, according to an example embodiment.

Referring generally to the figures, systems and methods for secure multi-party computation of data records. The systems and methods described herein provide for improved data security, integrity, and privacy protection by utilizing secure multi-party computation to match and sort privacy-safe data. For instance, the systems and methods described herein provide for an improvement over typical data processing systems because the present systems and methods do not identify or include private information when performing computations such as matching and sorting of the data. Instead, the present systems and methods generate an SMC token to be included in the data and used for performing the computations. By doing so, the present systems and methods ensures that individual data remains private throughout the computation process. Only the final result is shared, protecting sensitive information from unauthorized access. Likewise, by utilizing SMC, the present systems and methods provide for improved data security and can protect against malicious parties who may attempt to steal or manipulate data. The cryptographic protocols used in SMC ensure that the integrity and confidentiality of the data are maintained, which also reduces the risk of data breaches and the associated consequences.

Additionally, by classifying the raw data based on its content and then cleaning the data based on the classification of the raw data, the present systems and methods provide technical improvements to data quality, consistency, and data processing. For instance, because the present systems classify the raw data based on its content and then clean the data based on the classification, the present systems and methods provide a structured framework that facilitates efficient processing, storage, and retrieval of raw data. Likewise, by classifying the data based on content, it becomes easier to extract relevant information and remove irrelevant or noise. Additionally, because the data is cleaned based on its classification, the present systems and methods can optimize data processing by reducing the computational resources required for subsequent tasks. For example, removing irrelevant information from the data can significantly reduce the processing time for matching data records at step 228.

Moreover, by generating a temporary copy of a master data record repository, the present systems and methods isolate the master data record repository and thereby provide a technical improvement to data security, storage and integrity. For example, by creating a temporary copy, the present systems effectively isolate the master data records from potential modifications or combination with untrusted data, thereby ensuring the integrity of the master data records. However, the temporary copy still provides a consistent snapshot of the data at a specific point in time, enabling reliable analysis and processing without concerns about modification or damage to the master data records. Likewise, because the temporary copy of the master data record repository is isolated from the received raw data records, customers can provide their proprietary data without the data becoming available to others. Further, by working with a temporary copy, the number of individuals or systems with access to the sensitive master data records are reduced, thereby improving data security. For instance, by generating a temporary copy of the data and not using the data directly, the present systems and methods minimizes the risk of the master data record repository being accessed or modified by an adverse party.

The systems and methods described herein further provide for improved structuring and generation of electronic files. For example, because the electronic file is dynamically structured and includes specific data records, as decided by a user building a query, the electronic file does not include excess or unwanted values and therefore requires less memory to be stored and less processing power to be shared between computing devices and systems. For example, if the electronic file were generated as a statically structured file (e.g., included the same data records every time) and still included all the values, insights, and data described herein, the electronic file would include excess data that was unwanted by the user or the computing device/system to which the electronic file is provided. The excess data would make the electronic file larger, thereby requiring additional memory to store the electronic file and additional processing power to generate and share the electronic file. In comparison, because the systems and methods described herein dynamically structure the electronic file through use of a query, as decided by the user and/or the device/system to which the electronic file is provided, the electronic file includes only requested data, reducing the memory required by the provider computing system to store the electronic file and processing power required by the provider computing system to generate and share the electronic file.

Likewise, because the electronic file is dynamically generated as a specified file type, as decided by the user or the computing device/system to which the electronic file is provided, the systems and methods described herein may provide for improved shareability of the electronic file as well as use less processing power and memory. For example, in situations where the electronic file is only generated as a static file type, third-party computing systems and recipient computing devices (e.g., the recipient computing device) may have to perform additional file modification and conversion or request the provider computing system to do so, which requires additional processing power, memory (to keep two files), and time. In comparison, the systems and methods described herein allow the user to specify the file type of the electronic file through the electronic file generation request. Accordingly, the user can specify the wanted file type the first time and the provider computing system will generate the electronic file as the specified file type. As a result, no additional file modification or conversion is required, reducing processing power usage, memory usage, and overall processing time for the provider computing system.

As used herein, "data records" or "health data records" can include data related to a patient's medical history such as symptoms, diagnosis data (e.g., an ICD-10 diagnosis code), procedures, medical claims (Mx) data, clinical data, electronic health record (EHR) data (including Rx data, lab tests/vitals, and the like), test results, genomic result or genomic test result, prescription claims (Rx) data associated with one or more medical products (e.g., including transaction data, prescribing HCP national prescriber identifier (NPI), medical product data, date/time data, diagnosis data, and the like), medical claims (Mx) data associated with national health insurance (e.g., Medicare or Medicaid) claims data associated with one or more medical products (e.g., including transaction data, prescribing HCP national prescriber identifier (NPI), and medical outcomes. Further, "data records" or "health data records" can include private health data (PHI) such as a patient's name, address, IP address, contact data, and the like.

Additionally, as used herein the terms "information" and "data" may be used interchangeably such that one may be substituted for the other and vice versa.

Referring now to FIG. 1, a system 100 for managing and producing SMC data records is shown, according to an example embodiment. The system 100 includes a provider computing system 104, a covered entity computing system 108, a client computing device 112, a data service repository 120, and a token generation computing system 106 connected by a secure network (e.g., a network 118).

The network 118 communicably and operably couples the provider computing system 104, the covered entity computing system 108, the client computing device 112, the data service repository 120 and the token generation computing system 106 such that communicable and operable computing may be provided between the provider computing system 104, the covered entity computing system 108, the client computing device 112, the data service repository 120, and token generation computing system 106 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the client computing device 112 over the network 118 in response to authenticating the client computing device 112. In some examples, the provider computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, and a master data record repository 130, one or more ingested data record repositories 132, and one or more combined data record repositories 134. In some embodiments, the provider computing system 104 may include an input/output circuit (e.g., similar to (e.g., the same as) an input/output circuit 180 as will described further herein).

The network interface 126 is structured to establish connections with the covered entity computing system 108, the client computing device 112, the data service repository 120, and the token generation computing system 106 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 136, a processor 140, a request generation and management circuit 144, a data ingestion and matching circuit 148, and a file generation circuit 150. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components. As described herein, each circuit of the processing circuit 128 may be associated with a separate server computing system (including a memory and processor therein). For instance, a first server computing device of the provider computing system 104 may perform the operations of the request generation and management circuit 144; a second server computing device of the provider computing system 104 may perform the operations of the data ingestion and matching circuit 148; and a third server computing device of the provider computing system 104 may perform the operations of the file generation circuit 150.

As described herein, the request generation and management circuit 144 is configured and/or structured to generate and manage data record requests that may be provided to the covered entity computing system 108. For instance, the request generation and management circuit 144 may be configured or structured to retrieve data included in the data record request (e.g., a timeframe for which data records are sought), Health Care Provider (HCP) data (e.g., from an HCP repository (not shown)) for which matching or associated data records are sought, government health data from a national health repository (not shown)) for which matching or associated data records are sought, medical product data for which matching or associated data records are sought (e.g., from a medical domain repository (not shown)), or any combination thereof. Further, the request generation and management circuit 144 may be configured or structured to generate the data record request including the data included in the request and provide the data record request to the covered entity computing system 108. In some embodiments, the request generation and management circuit 144 may be configured to generate and provide the data record request to the covered entity computing system 108 at specific time intervals (e.g., every hour, every day, every week, every month, etc.), and, as a result, the provider computing system 104 may receive the data records at the specific time intervals. By doing so, the provider computing system 104 may act as a centralized source of reliable, up to date, data records (e.g., health data records). For instance, because the request generation circuit 144 may generate and provide the data record request to the covered entity computing system 108 at specific time intervals, the provider computing system 104 may receive updated data records at the specific time intervals and continuously keep up-to-date data records.

In some embodiments, the request generation and management circuit 144 is further configured and/or structured to receive a file generation request. The file generation request may identify one or more statistical values and a recipient address (e.g., an IP address, an email address, an FTP address, etc.). In other embodiments, the one or more statistical values and the recipient address may be received within or accompanying the query by the query management circuit 148.

In some embodiments, the request generation and management circuit 144 is further configured and/or structured to receive the requested data records from the covered entity computing system(s) 108, clean and modify the data records, and store the cleaned data records in the master data record repository 130. In other embodiments, other circuits of the processing circuit 128 are configured or structured to receive the requested data records from the covered entity computing system(s) 108 and store the data records in the master data record repository 130.

In some embodiments, the request generation and management circuit 144 is further configured and/or structured to clean the received data records and determine and generate multiple attributes of the data records to augment or add to the data records. For instance, the request generation and management circuit 144 may clean the data records by deduplicating data records that appear multiple times (e.g., removing or combining multiple duplicate records into a single data record). In other examples, the request generation and management circuit 144 may determine and/or generate a reject code classification associated with at least one of the data records and add the reject code classification to the at least one data record, as will be described further herein. In other embodiments, a data record and attribute management circuit (not shown) of the processing circuit 128 may clean, group, and add attributes to the data records.

The data ingestion and matching circuit 148 is configured and/or structured to ingest (e.g., clean, modify, etc.) raw data records from the data service repository 120 and store the ingested data records in the ingested data record repository 132. As described herein, the raw data records may have no particular structure or data schema but relate to health records for patients. In this regard, the raw data records may be deidentified and include a patient token (e.g., tokenized patient private health information (PHI)). The patient token may be deidentified but provide a specific value for correlating the patient of one raw data record to the patient of another raw data record.

The data ingestion and matching circuit 148 may receive a data mapping file for mapping the raw data records to a schema of the data ingestion and matching circuit 148. In response, the data ingestion and matching circuit 148 may clean and modify the raw data records based on the data mapping file. Then, the data ingestion and matching circuit 148 may generate a Secure Multiparty Computation (SMC) token based on the patient token and add the SMC token to each raw data record. SMC is a cryptographic technique that enables multiple parties to compute a function over their private inputs without revealing individual inputs to each other. This is achieved through secure protocols that ensure the integrity and confidentiality of the data throughout the computation process. Essentially, SMC allows for collaborative computations without compromising data privacy. For example, parties can collaborate on deidentified data records without sharing identity information or PHI. In one example, the SMC token may be a garbled circuit protocol token. The SMC token is still deidentified but provides for matching between the master data records of the master data record repository 130 and the raw data records without identifying the PHI of any of the data records. In some embodiments, the data ingestion and matching circuit 148 may provide each raw data record to the token generation computing system 106, which may generate and add the SMC token to each data record.

Once the data ingestion and matching circuit 148 has added the SMC token to the raw data records, the data ingestion and matching circuit 148 may generate a copy of the master data record repository (as will be described further herein) and match the raw data records to the data records of the copy of the master data record repository. Then, the data ingestion and matching circuit 148 may store the copy of the master data record repository and the raw data records in one of the combined data record repositories 134.

Still referring to FIG. 1, the file generation circuit 150 may be configured to receive a query (also referred to as a customizable or mutable query) from the client computing device 112 and execute the query on one of the combined data record repositories 134 to select one or more of the data records stored therein. For example, the provider computing system 104 may receive a customizable query that includes multiple configuration properties (also referred to as query parameters) (e.g., a first configuration property and a second configuration property) from the client computing device 112. The first configuration property may identify a specific medical product (e.g., Drug X), and the second configuration property may identify a specific date range (e.g., Jan. 1, 2021-Jan. 1, 2022). In response, the query management circuit 148 may execute the query on the combined data record repository 134 by selecting or receiving data records that are associated with the medical product (e.g., a prescription for Vaccine Y, EHR indicating a patient received Drug X, etc.) and between the specific date range from the combined data record repository 134.

As described herein, each configuration property may be a property or query parameter through which the provider computing system 104 selects, filters, and refines the (aggregate) data records of the combined data record repositories 134. For instance, a first configuration property may identify or include a medical product (e.g., Drug x) for which data records (e.g., health data records) and/or patient's (who received a prescription for Drug X) data records are sought. In another example, a second configuration property may identify or include a diagnosis code (e.g., code 123) for which data records (e.g., health data records) and/or patients (who received a diagnosis of diagnosis code 123) data records are sought. Other configuration properties will be described further, but may include procedures (e.g., procedure codes), generated or determine attributes (e.g., transaction status or state (e.g., rejected, dispensed, reversed), rejection code classification, a disposition or order of the data record (e.g., interim record, final record, etc.), etc.), timeframes, demographic features (e.g., gender, age range or age, etc.), location (e.g., zip code, state, country, county, etc.), payment type (e.g., private insurance, national health insurance (e.g., Medicare, Medicaid, Medicare part A-D, etc.)), activity or number of occurrences (e.g., a minimum of 5 prescriptions, a prescription at least once a year, a prescription at least once a quarter, maximum of 10 prescriptions, etc.), prescribing HCP specialty (e.g., Pediatrician, Cardiologist, etc.), and/or a sequence of one or more configuration properties (e.g., a diagnosis of diagnosis code 123 before (i.e., at an earlier date) than a prescription of Drug X, a prescription of Drug X before a procedure for procedure code 123, etc.).

The file generation circuit 150 is further configured and/or structured to generate an electronic file based on the file generation request or the query. For instance, once the file generation circuit 150 has executed the customizable query and selected the matching data records (and aggregated the portion of the health data), the file generation circuit 150 may generate a file of a specified format (e.g., comma-separated value (CSV) format, Excel (XLS) format, etc.) and populate it with the matching data records. Because the electronic file is generated as a specified file format, the electronic file can be shared with a variety of destinations and quickly parsed and analyzed. In some embodiments, the file generation request may indicate the specified file format that the electronic file is to be.

The master data record repository 130 is a repository (e.g., a database, cloud storage, etc.) that is structured or configured to receive, store, and manage data records (e.g., health data records) received from the one or more covered entity computing systems 108. For example, the master data record repository 130 may receive Rx data, Mx data, EHR, government health record data, and the like from the one or more covered entity computing systems 108. Each health data record may be associated with a specific medical product(s) (e.g., drug name, one or more substances included in the medical product, trade name, use cases, diagnosis code(s)), deidentified PHI (e.g., tokenized PHI), demographic data (e.g., age range, payer type, zip code, 3-digit zip code, etc.), and/or an HCP (e.g., NPI of the HCP). In some embodiments, the data records may be aggregated by a specific aggregation type (e.g., patient, HCP, location, etc.). The master data record repository 130 may be considered a trusted or reliable source of data records. Further, the master data record repository 130 can be structured according to various database types, such as, relational, hierarchical, network, flat, point-in time, and/or object relational. In some embodiments, the master data record repository 130 includes a plurality of nonvolatile/non-transitory storage media such as solid-state storage media, hard disk storage media, virtual storage media, cloud-based storage drives, storage servers, and/or the like. In some embodiments, the provider computing system 104 may include a separate repository for each type of health data records (e.g., a prescription claims repository (not shown) for Rx data, a medical claims repository (not shown) for Mx data, an electronic health record repository (not shown) for EHR, a government health data repository (not shown) for government health data), etc.).

Likewise, the ingested data record repositories 132 may each be a repository for storing the received ingested raw data records. In some embodiments, the provider computing system 104 may include a separate ingested data record repository 132 for each set of received raw data records. In other embodiments, the provider computing system 104 may include a separate ingested data record repository 132 for each customer. Each ingested data record repository 132 can be structured according to various database types, such as, relational, hierarchical, network, flat, point-in time, and/or object relational. In some embodiments, each ingested data record repository 132 includes a plurality of nonvolatile/non-transitory storage media such as solid-state storage media, hard disk storage media, virtual storage media, cloud-based storage drives, storage servers, and/or the like.

Similarly, the combined data record repositories 134 may each be a repository for storing the copy of the master data record 130 and the ingested data records. In some embodiments, the provider computing system 104 may include a separate combined data record repositories 134 for each set of received raw data records. In other embodiments, the provider computing system 104 may include a separate combined data record repositories 134 for each customer. Each combined data record repositories 134 can be structured according to various database types, such as, relational, hierarchical, network, flat, point-in time, and/or object relational. In some embodiments, each combined data record repositories 134 includes a plurality of nonvolatile/non-transitory storage media such as solid-state storage media, hard disk storage media, virtual storage media, cloud-based storage drives, storage servers, and/or the like.

In some embodiments, the provider computing system 104 further includes a medical domain repository (not shown) that receives, stores, and manages various medical domain data (e.g., medical product data, procedure data (e.g., procedure codes and descriptions), and diagnosis data (e.g., diagnosis codes and descriptions)). While not shown, the medical domain repository may be structured similar to the master data record repository 130. In one instance, the medical domain repository may receive a grouping of multiple drugs or medical products as specified by the user of the client computing device 112. As will be described herein, the grouping of drugs may be utilized by the user in generating the customizable query.

Still referring to FIG. 1, the token generation computing system 106 may each include a computer system (e.g., one or more servers each with one or more processing circuits) and be operated by a token provider (e.g., Datavant, LiveRamp, etc.). In operation, the token generation computing system 106 may receive data records including deidentified patient tokens (and a private key) and generate SMC tokens based on the patient tokens. Then, the token generation computing system 106 may replace the patient token of each data record with the corresponding SMC token. As shown, the token generation computing system 106 may include a network interface 153, a processing circuit 154, and a token repository 158. In some embodiments, the token generation computing system 106 may include an input/output circuit (e.g., similar to the input/output circuit 180).

The network interface 153 is structured to establish connections with the provider computing system 104 and the data service repository 120 by way of the network 118. The network interface 153 includes program logic and/or hardware-based components that connect the token generation computing system 106 to the network 118. For example, the network interface 153 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 153 includes the hardware and machine-readable media structured to support communication over multiple channels of data communication (e.g., wireless, Bluetooth, near-field communication (NFC). In some embodiments, the network interface 153 includes cryptography logic and capabilities to establish a secure communications session.

The processing circuit 154, as shown, comprises a memory 155, a processor 156, and a token generation circuit 157. The memory 155 includes one or more memory devices (e.g., RAM, NVRAM, ROM, flash memory, hard disk storage, etc.) that store data and/or computer code for facilitating the various processes described herein. That is, in operation and use, the memory 155 stores at least portions of instructions and data for execution by the processor 156 to control the processing circuit 154. The memory 155 may be or include tangible, non-transient volatile memory and/or non-volatile memory. The processor 156 may be implemented as a general-purpose processor, an application specific integrated circuit (ASIC), one or more field programmable gate array (FPGAs), a digital signal processor (DSP), a group of processing components or other suitable electronic processing components.

The token generation circuit 157 may be configured and/or structured to receive a patient token and generate an SMC token, based on the patient token. For instance, the token generation circuit 157 may receive a set of deidentified patient tokens and a private key (e.g., a private key of the provider computing system 104). Then, the token generation computing system 106 may generate a set of SMC tokens based on the deidentified patient tokens. For instance, the token generation computing system 106 may decrypt the patient token, using the private key, and then run another SMC encryption algorithm on the decrypted patient token. In another example, the token generation computing system 106 may have the original value of the patient token (in addition to the patient token) in the token repository 158. Accordingly, the token generation computing system 106 may exchange the patient token for the original value (e.g., the name, the DOB, etc.), and generate the SMC tokens based on the original value of the patient token and the private key.

In this regard, the token repository 158 may be a repository (e.g., a database, cloud storage, etc.) that is structured or configured to receive, store, and manage patient tokens and their corresponding original value (e.g., identifying data (name, DOB, address, etc.)). For example, the token repository 158 may receive identifying data and a deidentified patient token representing the identifying data. The identifying data and the token may be a pair, such that one is used to identify and locate the other. The token repository 158 can be structured according to various database types, such as, relational, hierarchical, network, flat, point-in time, and/or object relational. In some embodiments, the token repository 158 includes a plurality of nonvolatile/non-transitory storage media such as solid-state storage media, hard disk storage media, virtual storage media, cloud-based storage drives, storage servers, and/or the like.

Still referring to FIG. 1, the one or more covered entity computing systems 108 may each include a computer system (e.g., one or more servers each with one or more processing circuits) and be operated by, be managed by, and/or operate on a data network of a "covered entity" as defined by the Health Insurance Portability and Accountability Act of 1996 (HIPAA) (or other laws that protect health data). For example, the covered entity may be a pharmacy chain (e.g., a pharmacy company) with access to prescription claims data, a medical claims company (e.g., a medical insurance company) with access to medical claims data, a medical provider with access to EHR data, or a government entity with access to national health insurance (e.g., Medicare or Medicaid) claims data, and the like. In this regard, the covered entity computing system 108 may have direct access to health data records including PHI, prescription data, diagnosis data, and other health data associated with one or more patients. As shown, the covered entity computing system 108 may include a network interface 159, a processing circuit 160, and a Rx and Mx data record repository 164. In some embodiments, the covered entity computing system 108 may include an input/output circuit (e.g., similar to the input/output circuit 180).

The network interface 159 is structured to establish connections with the provider computing system 104 and the data service repository 120 by way of the network 118. The network interface 159 includes program logic and/or hardware-based components that connect the covered entity computing system 108 to the network 118. For example, the network interface 159 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 159 includes the hardware and machine-readable media structured to support communication over multiple channels of data communication (e.g., wireless, Bluetooth, near-field communication (NFC). In some embodiments, the network interface 159 includes cryptography logic and capabilities to establish a secure communications session.

The processing circuit 160, as shown, comprises a memory 168, a processor 170, a data matching circuit 172, and a deidentification circuit 174. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The data matching circuit 172 is structured and/or configured to receive the data record requests from the provider computing system 104 including any additional data for which matching data records are sought (e.g., consumer data, HCP data, etc.) and determine the matching data records. For instance, the data matching circuit 172 may receive a data record request including medical product data (e.g., a list of medical products) for which matching data records are sought. The data matching circuit 172 may then search or query the prescription and medical claims repository 164 for data records that is associated with one or more of the medical products of the medical product data. For example, the data matching circuit 172 may search and return a data record (e.g., an Rx transaction) which is associated with a medical product of the medical product data. In another example, the data matching circuit 172 may search and return data records that matched with consumer data (e.g., demographic data), which may be matched based on identifying data of the data records and the consumer data.

In some embodiments, the covered entity computing system 108 (and more particularly the data matching circuit 172) is structured to aggregate various pieces of internal and external data (e.g., prescription claim (Rx) data, medical claim (Mx) data, media exposure data, HCP data, patient demographics, and the like) based on aggregation type (as described with regard to the query management circuit 148 of the provider computing system 104).

The deidentification circuit 174 is structured to receive the matched data records and deidentify any identifying data (e.g., PHI) included within the matched health data and corresponding data (e.g., consumer data). To deidentify the identifying data of the matched health data, the deidentification circuit 174 may first determine any identifying data included in the matched data records and then perform one or more operations to remove the associated patient's identity or related private data. In some embodiments, the deidentification circuit 174 may deidentify identifying data of the data records by encrypting the identifying data, tokenizing the identifying data, or by performing some other data masking function. In some embodiments, the deidentification circuit 174 may generate a SMC token based on the identifying data and populate the data record with the SMC token.

In some embodiments, all covered entity computing systems 108 from which data records are received by the provider computing system 104 may use the algorithm to generate SMC tokens to provide for consistent SMC tokens across the covered entity computing systems 108. For example, because each covered entity computing system 108 may use the same algorithm to generate SMC tokens, the provider computing system 104 may receive data records, with deidentified PHI, from multiple covered entity computing systems 108. For example, the provider computing system 104 may receive health data including Rx data from a pharmacy chain covered entity computing system, data records including Mx data from a medical claims company, data records including clinical data from a medical provider (e.g., a hospital), and government health data records (e.g., Medicare data, Medicaid data, etc.) including national health insurance claims data from a national health insurance provider, each data record including deidentified PHI. Then, the provider computing system 104 may match the various pieces of the received data records based on the deidentified PHI and specifically based on matching SMC tokens.

In other embodiments, the deidentification circuit 174 may deidentify identifying data (e.g., PHI) of the data records by performing a hash function on the identifying data. For example, the deidentification circuit 174 may perform a hash function on the private health data that removes the identity or private data of the patient and returns a hash value in place of the identifying data. Example hash functions include, but are not limited to, the mid-square method, string folding, and the like.

Once the deidentification circuit 174 has deidentified the identifying data of the matching data records, the processing circuit 160 and the network interface 159 may be structured to send the data records, including the deidentified PHI, to the provider computing system 104, in response to the data record request. In some embodiments, the covered entity computing system 108 may receive data record requests at specific time intervals and provide the matched data records to the provider computing system 104 at the same time intervals. In this way, the provider computing system 104 may have up-to-date data records and act as a centralized source of reliable data records.

The Rx and Mx data record repository 164 is a repository that receives, stores, and manages various Rx data and/or Mx data associated with the customers or users of the covered entity. To do so, the Rx and Mx data record repository 164 can be structured according to various database types, such as, relational, hierarchical, network, flat, point-in time, and/or object relational. In operation, the Rx and Mx data record repository 164 is configured to store Rx and/or Mx data. In some embodiments, the prescription and medical claims repository 164 is a health data record repository 164 configured to store health data including PHI, Rx data, medical product data, Mx data, and the like. For example, if the covered entity is a medical claims company, the covered entity computing system may include a medical claims database to store medical claims data. In another example, the covered entity computing system 108 may include a national health insurance claims database or an electronic health record database. In some embodiments, the Rx and Mx data record repository 164 is not included in the covered entity computing system 108 but is connected to the covered entity computing system 108 over a covered entity private network or the network 118. In other embodiments, each covered entity computing system 108 may include multiple repositories for each piece of separately stored health data (i.e., a separate repository for Rx data, EHR data, and for Mx data).

Rx data can include transaction data for prescriptions filled by a patient. For example, the Rx data may include medical product data, patient data, PHI, transaction cost/price data, prescribing HCP data, date/time data, and the like. Mx data can include transaction data for medical procedures/treatments filled by a patient. For example, the Mx data may include medical product data, patient data, PHI, transaction cost/price data, prescribing HCP data, date/time data, and the like. EHR data may be similar and include similar data to the Rx and Mx data.

Still referring to FIG. 1, the client computing device 112 can be any type of computing device or computing system. For instance, the client computing device 112 can be one or more of a mobile phone, a tablet computer, a laptop computer, a smart watch, a server computer system, and any other internet-connected device that is capable of running an application. In operation, the client computing device 112 may generate and provide a data query to the provider computing system 104 and receive an electronic file, in response. In some embodiments, the client computing device 112 may provide the raw data records to the provider computing system 104. In this regard, the client computing device may include a data record repository (not shown) for storing raw data records. As shown, the client computing device 112 may include a network interface 176, a processing circuit 178, and the input/output circuit 180.

The network interface 176 is structured to establish connections with the provider computing system 104 and the data service data repository 128 by way of the network 118. The network interface 176 may be similar to the network interface 126 and include program logic and/or hardware-based components that connect the client computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, may comprise a memory 182, a processor 184, and a user interface generation circuit 185. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface generation or rendering circuit 185 may be configured to receive a user interface (e.g., a web interface in an HTML file and related files, a downloaded graphical user interface, etc.) from the provider computing system 104 and render the user interface on the client computing device 112 via the I/O circuit 180. In this way, the provider computing system 104 may generate one or more user interfaces and provide the one or more user interfaces to the user interface generation circuit 185 to be rendered on the client computing device 112 (e.g., on a display of the I/O circuit 148 of the user device 112).

The I/O circuit 180 is structured to receive communications from and provide communications to the user of the client computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, an RFID scanner, or other input or output devices described herein.

Still referring to FIG. 1, the data service repository 120 is a repository that receives, stores, and manages customers' raw data records. In one example, the data service repository 120 may be a repository of a data service computing system and associated with a data service provider. Likewise, as described herein the raw data records may have no particular structure or data schema but relate to health records for patients. In this regard, the raw data records may be deidentified and include a patient token (e.g., tokenized patient private health information (PHI)). In some embodiments, the raw data records may be Rx data transactions from a specialty pharmacy (SP). In other embodiments, the raw data records may be laboratory test results. In other embodiments, the raw data records may be genomics data. In other embodiments, the raw data records may be at least one of: dental records, patient enrollment records, medical imaging records, device manufacturer records, or electronic health records. The data service repository 120 can be structured according to various repository types, such as, relational, hierarchical, network, flat, point-in time, and/or object relational.

Figure 2A:
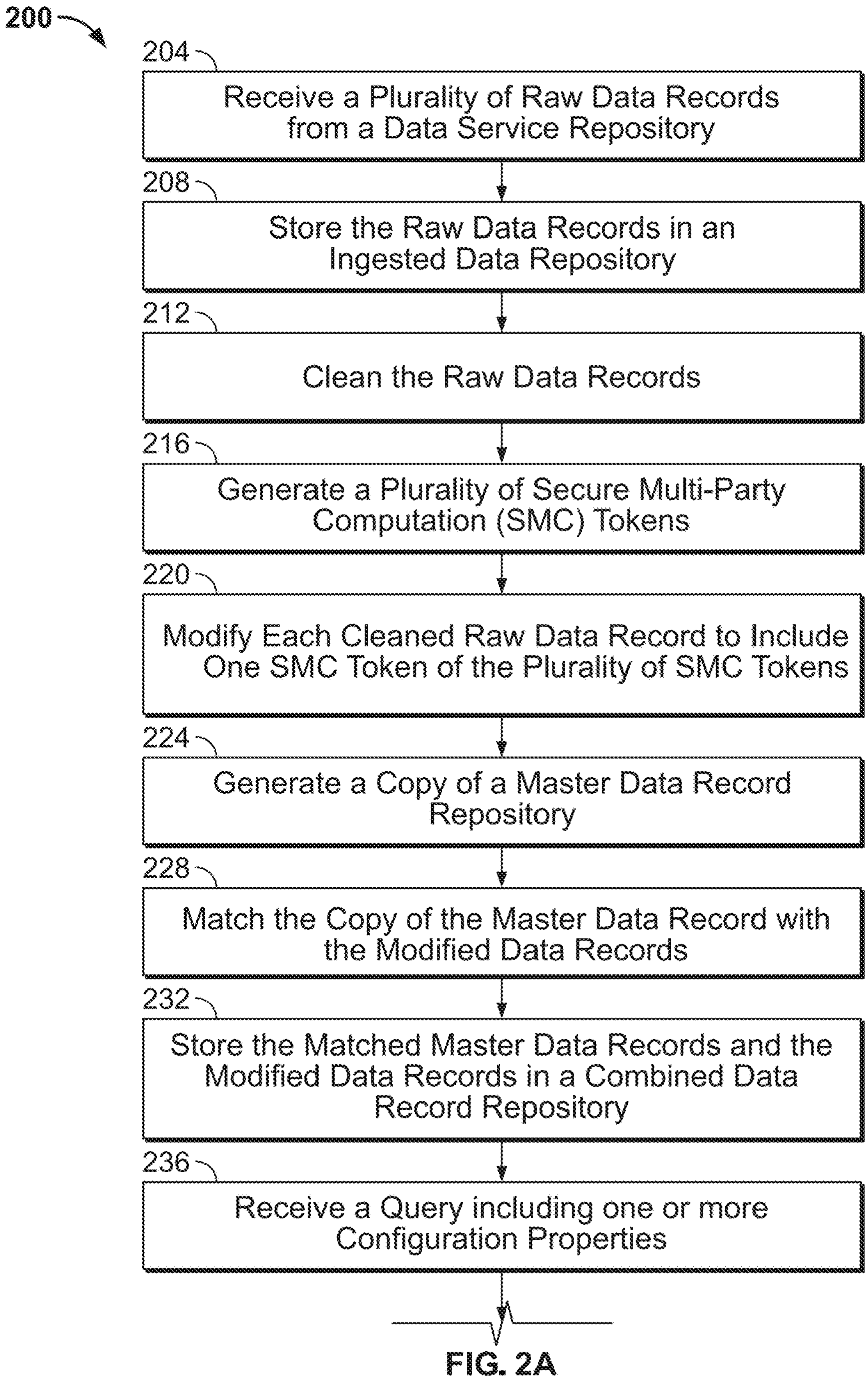
FIGS. 2A-2B are a flow diagram of a method for matching secure data records, according to an example embodiment.
Figure 2B:
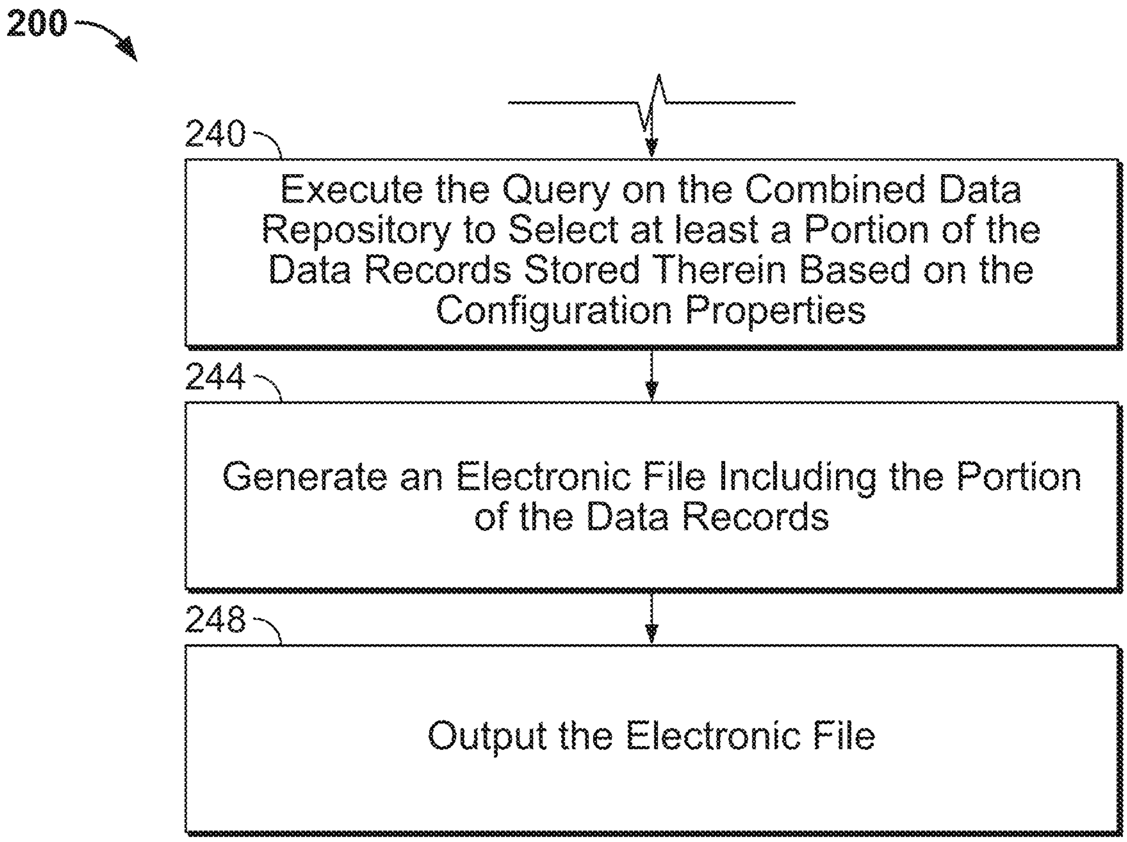

Referring now to FIG. 2, a method 200 of q for matching secure data records from multiple sources is shown, according to an example embodiment. Method 200 can be carried out by the system 100 of FIG. 1. More particularly, the method 200 can be carried out by the processing circuit 128 of the provider computing system 104 and through communication with the covered entity computing system 108, and the client computing device 112.

Method 200 commences at step 204 at which the provider computing system 104 receives multiple raw data records from the data service repository 120. As described herein, the raw data records may be raw and variably structured in that there is no presumed format or data schema for the incoming raw data records. However, the raw data records may be presumed to include a deidentified patient identifier (e.g., a patient token, a patient hash value, etc.). For instance, each raw data record may include a patient token (e.g., "PT1342234"), In one example, the provider computing system 104 may receive a first set of raw data records from a first data service repository 120 and a second set of raw data records from a second data service repository (not shown). The first set of raw data records and the second set of raw data records may have different formatting and/or data schemas. In some embodiments, the provider computing system 104 may receive the raw data records from a data partner/service computing system (not shown) including the data service repository 120.

In some embodiments, prior to step 204, the provider computing system 104 may receive a data record mapping file associated with the specific set of raw data records. The data record mapping file may map the schema of the raw data records to a data schema of the provider computing system 104. For instance, the data record mapping file may indicate each raw data record includes a field in a first row that is the same as the "patient token" field of the provider computing system 104 data schema. In some embodiments, after receiving the data record mapping file, the provider computing system 104 may store the data record mapping file therein (e.g., in a data record mapping file repository (not shown)).

In some embodiments, after step 204, the provider computing system 104 may classify or categorize the raw data records based on the raw data record (e.g., based on the data included in each record). For instance, the provider computing system 104 may classify the raw data records into a first category (e.g., SP data), a second category (e.g., laboratory test results), a third category (e.g., genomics data), a fourth category (e.g., dental records), and the like. In one example, the provider computing system 104 may analyze a specific raw data record and determine it includes SP data (e.g., based on a SP identifier, a transaction number, etc.). Then, the provider computing system 104 may classify the raw data record into the first category. In another example, the provider computing system 104 may analyze a second specific raw data record and determine it includes laboratory test results (e.g., based on it including a Logical Observation Identifiers Names and Codes (LOINC) code, a LOINC name, a laboratory ID, etc.). Then, the provider computing system 104 may classify the second specific raw data record into the second category.

In some embodiments, the raw data records may be received with a private key. The private key may be unique to the raw data records and used in the generation of an SMC token, as described further herein.

Once the provider computing system 104 has received the raw data records, the method 200 proceeds to step 208 at which the provider computing system 104 stores the raw data records in the ingested data repository 132. In some embodiments, if the ingested data repository 132 includes an old version or copy of the raw data records, the provider computing system 104 may overwrite (e.g., remove and add) the old copy of the raw data records with the new copy of the raw data records.

Once the provider computing system 104 has stored the raw data records, the method 200 proceeds to step 212 at which the provider computing system 104 cleans the raw data records. As described herein, the provider computing system 104 may clean the raw data records to standardize and enhance the raw data records. For instance, the provider computing system 104 may rename columns, validate/format specific values (e.g., year of birth, zip code, zip 3 code, modify the file type of the raw data records (e.g., from excel to CSV, etc.), remove specific characters (e.g., _, !, =, etc.), and the like. For instance, the provider computing system 104 may determine if a zip code field is valid. If the zip code value is not valid, the provider computing system 104 may replace the invalid zip code field with a null value or character. In some embodiments, the provider computing system 104 may clean the raw data records based on the data record mapping file. For instance, the provider computing system 104 may modify the raw data records to format the raw data records to match the schema of the provider computing system 104. For example, the provider computing system 104 may modify specific values of the raw data records to correspond to specific fields of the schema of the provider computing system 104, as indicated by the data record mapping file.

In some embodiments, the provider computing system 104 may clean (e.g., modify and/or arrange) the raw data records based on the classification of the raw data record and/or the data mapping file. For instance, the provider computing system 104 may modify a first raw data record classified into the first category to arrange the data record into a first data schema (e.g., a first classification or SP data schema). In another example, the provider computing system 104 may modify a second raw data record classified into the second category to arrange the data record into a second data schema (e.g., a second classification or laboratory test result data schema). In another example, the provider computing system 104 may modify a third raw data record classified into the third category to arrange the data record into a third data schema (e.g., a third classification or genomics data schema). In another example, the provider computing system 104 may modify a fourth raw data record classified into the third category to arrange the data record into the third data schema based on the data mapping file. In this regard, the data mapping file may map the portions of the data record to the fields and objects of the third data schema.

By classifying the raw data based on its content and then cleaning the data based on the classification of the raw data, the present systems and methods provide technical improvements to data quality, consistency, and data processing. For instance, because the present systems classify the raw data based on its content and then clean the data based on the classification, the present systems and methods provide a structured framework that facilitates efficient processing, storage, and retrieval of raw data. Likewise, by classifying the data based on content, it becomes easier to extract relevant information and remove irrelevant or noise. Additionally, because the data is cleaned based on its classification, the present systems and methods can optimize data processing by reducing the computational resources required for subsequent tasks. For example, removing irrelevant information from the data can significantly reduce the processing time for matching data records at step 228.

Once the provider computing system 104 has cleaned the raw data records, the method proceeds to step 216 at which the provider computing system 104 generates multiple SMC tokens. In some embodiments, the provider computing system 104 may generate an SMC token for each cleaned data record. In some embodiments, each SMC token may be generated based on the patient token of the specific cleaned data record and/or the private key received with the raw data records. For instance, a data record may include a specific patient token (e.g., PT12342423). Then, based on the patient token, the provider computing system 104 may generate the SMC token. For instance, the provider computing system 104 may decrypt the patient token and then run another SMC encryption algorithm on the decrypted patient token. In another example, the provider computing system 104 may receive the original value of the patient token (in addition to the patient token) and generate the SMC tokens based on the original value of the patient token.

In some embodiments, at step 220, the provider computing system 104 may output the cleaned data records for the generation and modification to include the SMC tokens. For instance, the provider computing system 104 may output the cleaned data records to the token generation computing system 106 for the generation and modification to include the SMC tokens. As described herein, the token generation computing system 106 may generate the SMC tokens based on the corresponding patient token of the specific cleaned data record and/or the private key received with the raw data records. In some embodiments, the provider computing system 104 may split the patient tokens from the rest of the raw data record. For instance, the provider computing system 104 may extract each patient token and provide the patient tokens to the token generation computing system 106 (and the private key). In response, the token generation computing system 106 may return a corresponding patient token-SMC token pair to be used to modify the raw data records.

In some embodiments, the raw data records are received, at step 204, with the SMC tokens included therein. In this regard, the provider computing system 104 may skip steps 216-220 and proceed to step 224.

Once the provider computing system 104 has generated the SMC tokens, the method proceeds to step 220 at which the provider computing system 104 modifies each cleaned data record to include one of the generated SMC tokens. As described herein, the provider computing system 104 may generate an SMC for each cleaned data record based on the patient token of the data record. Accordingly, the provider computing system 104 may then populate the cleaned data records with its specific SMC token. In some embodiments, the provider computing system 104 may generate an SMC token based on the patient token of the cleaned data record and immediately populate the data record with the SMC token. This process may be repeated for each cleaned data record of the multiple cleaned data records. In some embodiments, the SMC token may overwrite or replace the patient token of the cleaned data record. For instance, a first SMC token may be generated based on a first patient token of a first cleaned data record. Then, at step 220, the first cleaned data record may be modified to remove the first patient token and replace it with the first SMC token. In other embodiments, the SMC token may be added to the cleaned data record in addition to the patient token.

In some embodiments, the provider computing system 104 may match the patient token-SMC token pair received from the token generation computing system 106 to each specific patient token. Then, the provider computing system 104 may modify the raw data record to remove the patient token and replace it with the corresponding SMC token.

In some embodiments, after modifying each cleaned data record to include an SMC token, the provider computing system 104 may further modify (e.g., perform a secondary modification on) the data record to enhance (i.e., add data to) the cleaned and modified data record. For instance, the token generation computing system 106 may return patient tokens which did not result in a SMC token or output an error, as well as an error code. The provider computing system 104 may keep the raw data records with an invalid SMC token and add the error code in place of the SMC token. In another example, the provider computing system 104 may determine the data record includes a LOINC code and/or name. In response, the provider computing system 104 may match the LOINC code with a LOINC repository (not shown) and return a LOINC panel code and term associated with the LOIN code. The provider computing system 104 may then add the LOINC panel term and term to the data record. A LOINC panel is a collection of LOINC codes that represent a group of related tests or observations. In this regard, LOINC is hierarchical such that a LOINC panel may include multiple LOINC codes. In some embodiments, the secondary modification may be performed after matching the raw data records with the master data records (e.g., after step 228).

In another example, the provider computing system 104 may determine the data record includes a diagnosis code and/or name. In response, the provider computing system 104 may match the diagnosis code with a diagnosis code repository (not shown) and return a first (primary) diagnosis code class and a second diagnosis code class associated with the diagnosis code. The provider computing system 104 may then add the primary diagnosis code class and the second diagnosis code class to the data record. In another example, the provider computing system 104 may determine the data record includes a zip3 code, but not a state. In response, the provider computing system 104 may determine a state associated with the zip3 code and add the state to the data record.

In some embodiments, the provider computing system 104 may modify each data record based on the classification of the raw data record and/or the received mapping file. For instance, the provider computing system 104 may determine that raw data classified as test results includes a LOINC code, and modify the raw data accordingly. In comparison, the provider computing system may determine that raw data classified as SP data does not include a LOINC code but includes HCP NPI code for a prescribing HCP. Accordingly, the provider computing system 104 may match the HCP NPI with an HCP repository (not shown) and populate the data record with various portions of HCP data (e.g., HCP name, HCP zip code, HCP specialty (e.g., Pediatrician, Cardiologist, etc.), etc.).

Once the provider computing system 104 has modified each cleaned data record, the method 200 proceeds to step 224 at which the provider computing system 104 generates a copy of the master data record repository 130. As described herein, the master data record repository 130 may be an up-to-date, secure, and trusted store of data records (e.g., health data records (e.g., Rx transaction records, Mx transaction records, etc.)). U.S. patent application Ser. No. 18/524,602, filed on Nov. 30, 2023, which is hereby incorporated by reference in its entirety, describes some embodiments for populating, updating, and maintaining the master data record repository 130 (referred to therein as the data record repository 132). In this regard, the master data record repository 130 may include millions of trusted data records stored therein. Because the master data record repository 130 is a trusted and secure store of data records, the systems and method described herein may isolate the master data record repository 130 from the received raw data records and prevent the raw data records from entering the master data record repository 130. Accordingly, at step 224, the provider computing system 104 may generate a copy (e.g., a temporary copy) of the master data record repository 130. In some embodiments, the provider computing system 104 may generate or create temporary storage (e.g., an Amazon S3 bucket, a temporary data storage vehicle, etc.) and add each data record of the master data record repository 130 to the temporary storage. In other embodiments, the provider computing system 104 may directly copy each data record of the master data record repository 130 to one of the combined data record repositories 134. In some embodiments, the temporary storage may be deleted or removed once each data record of the master data record repository 130 is added to one of the combined data record repositories 134.

By generating a temporary copy of the master data record repository 130, the present systems and methods isolate the master data record repository 130 and thereby provide a technical improvement to data security, storage and integrity. For example, by creating a temporary copy, the present systems effectively isolate the master data records from potential modifications or combination with untrusted data, thereby ensuring the integrity of the master data records. However, the temporary copy still provides a consistent snapshot of the data at a specific point in time, enabling reliable analysis and processing without concerns about modification or damage to the master data records. Likewise, because the temporary copy of the master data record repository 130 is isolated from the received raw data records, customers can provide their proprietary data without the data becoming available to others. Further, by working with a temporary copy, the number of individuals or systems with access to the sensitive master data records are reduced, thereby improving data security. For instance, by generating a temporary copy of the data and not using the data directly, the present systems and methods minimizes the risk of the master data record repository 130 being accessed or modified by an adverse party.

In some embodiments, each data record of the master data record repository 130 may include a SMC token. In other embodiments, each data record of the master data record repository 130 may include a patient token. Then, after step 224, the provider computing system 104 may generate multiple SMC tokens (e.g., based on the patient tokens, as described herein) and populate or modify each data record to include one of the SMC tokens. In some embodiments, the provider computing system 104 may output each data record of the copy of the master data record repository 130 for generation and modification to include the SMC tokens. For instance, the provider computing system 104 may output the data records to the token generation computing system 106 for the generation and modification to include the SMC tokens.

Once the provider computing system 104 has generated the (temporary) copy of the master data record repository 130, the method 200 proceeds to step 228 at which the provider computing system 104 matches at least a portion of the copy of the master data record repository 130 with at least a portion of the modified data records. For example, the provider computing system 104 may determine a match between a first record of the copy of the master data record repository 130 and a second record of the modified data records based on the SMC tokens being the same (e.g., PT1232423). In another example, the provider computing system 104 may determine a match between the first record of the copy of the master data record repository 130, the second record of the modified data records, and a third record of the modified data records based on the SMC tokens being the same (e.g., PT1232423). In this regard, at step 228, the provider computing system 104 may determine each match between the data records of the copy of the master data record repository 130 and the modified data records. In some embodiments, for each match, the provider computing system 104 may generate and add a link (e.g., a hyperlink, a reference pointer, a data index, etc.) to the corresponding matching data record(s). For instance, using the first example above, the provider computing system 104 may generate a link to the second data record and add it to the first data record. Likewise, the provider computing system 104 may generate a link to the first data record and add it to the second data record.

Figure 3:
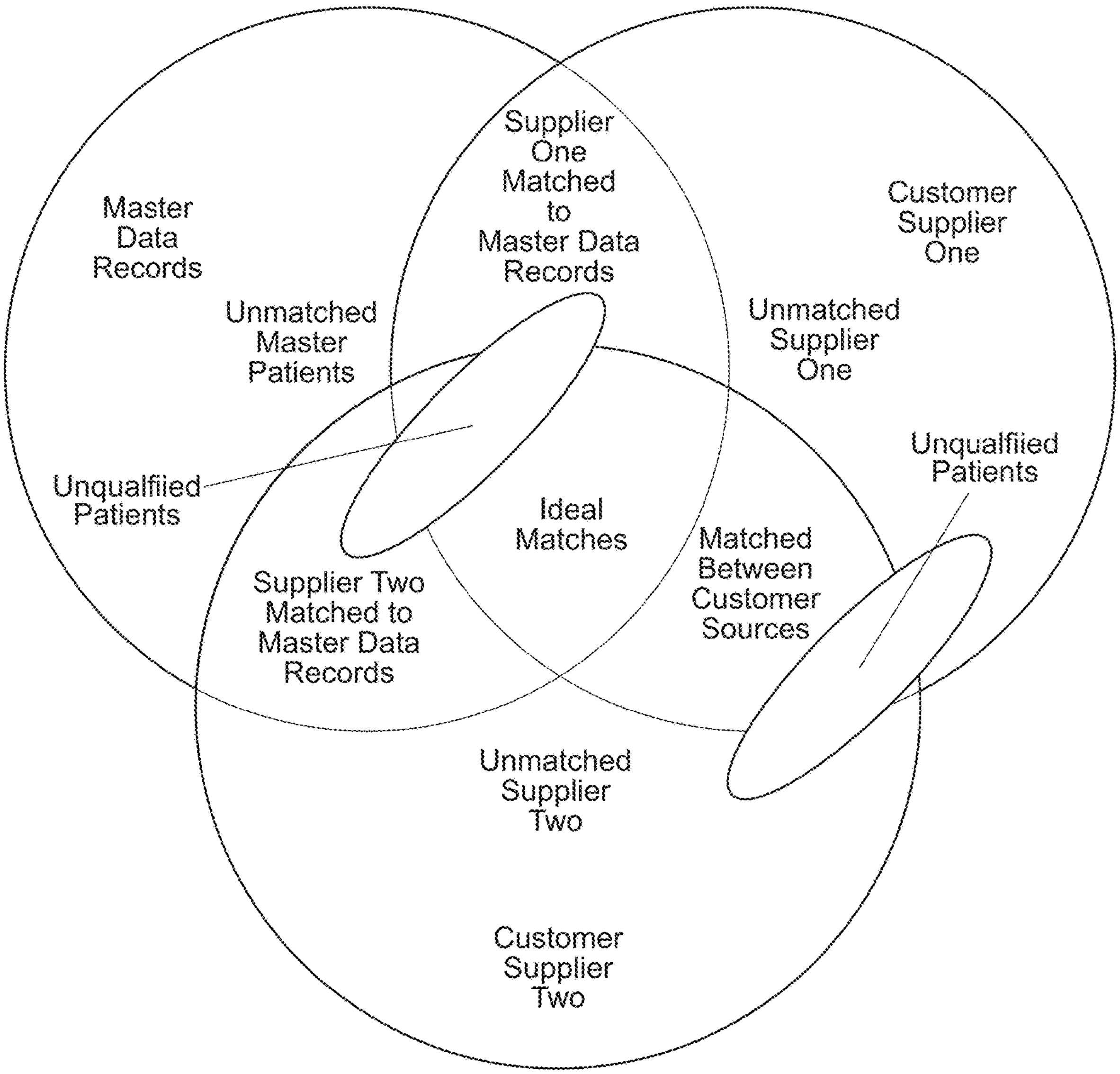
FIG. 3 is a Venn diagram of possible matches between sets of secure data records, according to an example embodiment.

In some embodiments, when determining a match between data records, the provider computing system 104 may determine a rank or classification of the match (e.g., likely match, suspected match, suspicious match, etc.). For example, the provider computing system 104 may determine a match between a first record of the copy of the master data record repository 130 and a second record of the modified data records based on the SMC tokens being the same (e.g., PT1232423). Then, in response to a first portion or field of the first record (e.g., year of birth of patient) being the same as a first portion or field of the second record (e.g., year of birth of patient), the provider computing system 104 may rank the match as a first and highest ranking (e.g., likely match). In comparison, in response to a first portion or field of the first record (e.g., year of birth of patient) being different or not the same as a first portion or field of the second record (e.g., year of birth of patient), the provider computing system 104 may rank the match as a second and lowest ranking (e.g., unqualified match). In comparison, in response to the first record or the second record missing the first field, the provider computing system 104 may rank the match as a third and middle ranking (e.g., qualified match). In some embodiments, the provider computing system 104 may rank the match between the records based on a combination of fields or portions of each record (e.g., year of birth of patient, zip (3) code of patient, patient initials, etc.). In some embodiments, the provider computing system 104 may add the ranking of the match to each data record to indicate the likelihood of the match being correct. In some embodiments, the provider computing system 104 may determine a match as being the highest ranking of match (likely match) or the third ranking (qualified match) of match but not the lowest ranking of match (unqualified match) FIG. 3 shows an example Venn diagram 300 of the types of matches that may take place between two sets of raw customer data records and the master data records of the master data record repository 130.

In some embodiments, when there is no match between a raw data record and any of the master data records, the provider computing system 104 may add a flag or indicator to the raw data record to indicate as such. For instance, the provider computing system 104 may receive three raw data records and determine a match between the first two raw data records and the master data records. However, the provider computing system 104 may determine that no match exists for the third raw data record and add a flag to the raw data record to indicate that no match was found.

In some embodiments, during or after step 228, the provider computing system 104 may determine a causality match between data records. For instance, the provider computing system 104 may determine that a first data record with a first classification (e.g., test result) resulted in another data record with a different classification (e.g., a prescription transaction). For instance, the provider computing system 104 may determine a first data record causality matches a second data record based on specific fields of the first data record matching specific fields of the second data record and/or specific fields of the first data record not matching specific fields of the second data record. For instance, the provider computing system 104 may causality match a first raw data record with a first classification with a second master data record with a second classification in response to: the first data record and the second data record each having the same SMC token; the first data record including a date field before a date field of the second data record; the first data record and the second data record each having the same DOB field; the first data record and the second data record including the same diagnosis code, primary diagnosis code class, and/or secondary diagnosis code class; and/or the like. In this regard, the provider computing system 104 may analyze the portions of the first data record and/or the second data record to determine an indication of causality between the data records. In some embodiments, when the provider computing system 104 determines a causality match, the provider computing system 104 may populate the specific data record with the record ID of the corresponding causality-matching data record (e.g., in a causality match field). For instance, using the example above, the provider computing system 104 may populate the first data record with the transaction ID of the second data record, and may populate the second data record with the transaction ID of the first data record.

Once the provider computing system 104 has matched at least a portion of the copy of the master data record repository 130 with at least a portion of the modified data records, the method 200 proceeds to step 232 at which the provider computing system 104 stores at least a portion the copy of the master record repository 130 and the modified data records in the combined data record repository 134. In some embodiments, the provider computing system 104 may add each of the modified data records to the combined data record repository 134. In some embodiments, the provider computing system 104 may add each of the modified data records with a match to the combined data record repository 134. In some embodiments, the provider computing system 104 may add each of the data records of the copy of the master data record repository 130 the combined data record repository 134. In some embodiments, the provider computing system 104 may add each of the data records of the copy of the master data record repository 130 with a match to the combined data record repository 134.

In some embodiments, when adding the data records to the combined data record repository 134, the provider computing system 104 may further arrange or organize the data records based on the matches of step 228. For instance, the provider computing system 104 may arrange the data records such that the matching records are located proximate or adjoining to the matching data records. For example, at step 228, the provider computing system 104 may determine a match between the first record of the copy of the master data record repository 130, the second record of the modified data records, and a third record of the modified data records based on the SMC tokens being the same (e.g., PT1232423). Then, at step 232, the provider computing system 104 may store the data records in the combined data record repository 134 such that the first record, the second record, and the third record are located proximate one another (e.g., the first data record is located at record index 100, the second data record is located at record index 101, the third data record is located at record index 102, etc.).

Once the provider computing system 104 has stored the data records in the combined data record repository 134, the method 200 proceeds to step 236 at which the provider computing system 104 receives a query including one or more configuration properties. In some embodiments, the query may be received from the client computing device 112. As described herein, the query may be designed by the user via the client computing device 112 and provided to the provider computing system 104 for cleaning and generation. For instance, the provider computing system 104 may generate a query page (also referred to as a query-designer or builder page, not shown) and provide the query page to the client computing device 112 for rendering and display thereon. Through interaction with the query page, the user of the client computing device 112 may design the query and provide the query to the provider computing system 104. The query may include multiple configuration properties (e.g., a first configuration property, a second configuration property, a third configuration property, etc.) and one or more operators, as will be described further herein.

In some embodiments, the query may be received in or as a part of an electronic file generation request. The electronic file generation request may further include a recipient address for the electronic file, a file type (e.g., PDF file, Excel® file, CSV file, etc.), of the electronic file, one or more statistical values to generate, and/or a date or time on which the electronic file is to be generated. For instance, at step 236, the provider computing system 104 may receive an electronic file generation request. The electronic file generation request may include a recipient address (e.g., person1@gmail.com), a file type (e.g., PDF file), the customizable query, and the date Jul. 1, 2021.

In some embodiments, after receiving the initial query from the client computing device 112 (e.g., at or after step 236), the provider computing system 104 may clean and transform the initial query and generate a final query. For instance, in response to receiving the initial query, the provider computing system 104 may modify (i.e., translate) the query to a specific query or data query language (e.g., American National Standards Institute (ANSI) Structured Query Language (SQL), Scala API, etc.). In some embodiments, the specific query or data query language may be based on the combined data record repository 134. For example, in response to the combined data record repository 134 being a relational database, the provider computing system 104 may modify or standardize (i.e., translate) the initial customizable query to the SQL. In another example, in response to the combined data record repository 134 being an Amazon Athena service instance, the provider computing system 104 may modify or standardize the initial customizable query to the SQL. In another example, in response to the combined data record repository 134 being an Amazon Simple Storage Service® (S3) Bucket, the provider computing system 104 may modify or standardize the initial customizable query to the Java programming language. In some embodiments, to clean the initial query, the provider computing system 104 may remove or replace specific characters or expressions. For instance, the provider computing system 104 may replace the character '=' in the expression "age=25" with the character '=='. In another example, the provider computing system 104 may replace the term age in the expression "age=25" with the term "age_c". In other examples, the provider computing system 104 may replace a list of medical products (e.g., Drug X, Drug Y, Drug Z, etc.) with a configuration property representing each medical property and the operator "OR" between each (e.g., "(Drug X OR Drug Y OR Drug Z)")

In some embodiments, after receiving the query, the provider computing system 104 may store the customizable query (e.g., within a query repository (not shown)) and/or generate a query file. The query file may be a specific file type (e.g., Excel file, PDF file, CSV File, etc.) and may be provided to the client computing device 112 by the provider computing system 104. For instance, the provider computing system 104 may generate a query file including a representation of the query (e.g., the configuration properties and/or operators used in the customizable query) and provide the query file to the client computing device 112. In this regard, the user of the client computing device 112 may then replicate the same query, based on the query file.

Once the provider computing system 104 has received the query from the client computing device 112, the method 200 proceeds to step 240 at which the provider computing system 104 (and more particularly the processing circuit 128) executes the (final) customizable query on the combined data record repository 134 to select/retrieve or receive at least a portion of the data records stored in the combined data record repository 134 (e.g., one or more of the data records of the copy of the master data record repository 130 and/or one or more of the modified data records). For instance, at step 236, the provider computing system 104 may provide the (final) query to the combined data record repository 134 which may then retrieve the matching or resulting data records from therein. In another example, the provider computing system 104 (and more particularly the processing circuit 128) may parse the combined data record repository 134 based on the query and select or retrieve the matching or resulting data records.

As described herein, the portion of the combined data records selected or received from the combined data record repository 134 may match or satisfy the query. In other words, the selected data records may match or meet the configuration propertie(s) and the operator(s) of the query. For instance, the customizable query may include a first configuration property (e.g., Drug X) and a second configuration property (e.g., Mx data), with the operator "AND" between the first configuration property and the second configuration property (i.e., "(Drug X AND Mx data)"). In response to receiving the query, the provider computing system 104 may execute the query and select or receive each data record from the combined data record repository 134 that is associated with Drug X and is the data record type of Mx.

In some embodiments, executing the query may include multiple steps or stages. For instance, at a first step, the provider computing system 104 may execute the query and select or receive each data record from the combined data record repository 134 that is associated with Drug X. Then, at a second step, the provider computing system 104 may filter the resulting data records to remove each data record that does not have the data record type of Mx.

Once the provider computing system 104 has executed the query and selected the portion of the data records from the combined data record repository 134, the method 200 proceeds to step 244 at which the provider computing system 104 generates an electronic file including the selected portion of the data records.

The electronic file may be generated as a specific file type as set by the client computing device 112 in the electronic file generation request. For example, the electronic file may be generated as a CSV file, an Excel File (XLSX file), an XML file, a JSON file, and the like. By allowing the client computing device 112 to decide and set the specific file type of the electronic file in the electronic file generation request and not generating the electronic file as one specific file type, the provider computing system 104 may provide for improved shareability of the electronic file as well as use less processing power and memory. For example, in situations where the electronic file is only generated as a specific, non-dynamic, file type, third-party computing systems and recipient computing devices (e.g., the client computing device 112) may have to perform additional file modification and conversion or request the provider computing system 104 to do so, which requires additional processing power, memory (to keep two files), and time. In comparison, the system 100 and the provider computing system 104 allow the user to specify the file type of the electronic file through the electronic file generation request. Accordingly, the user, via the client computing device 112, can specify the wanted file type the first time and the provider computing system 104 will generate the electronic as the specified file type. As a result, no additional file modification or conversion is required reducing processing power usage, memory usage, and overall processing time for the provider computing system 104.

Once the provider computing system 104 has generated the electronic file, the method 200 proceeds to step 248 at which the electronic file is provided or output. In some embodiments, the electronic file is output to the file destination address of the electronic file generation request. The file destination address may be any type of address or destination (e.g., IP address, web address, email address, file transfer protocol (FTP) address, and the like) to which the electronic file may be electronically transmitted or provided. In one example, the file destination address may be another server or circuit of the provider computing system 104 that is configured to receive the electronic file (e.g., Veeva Nitro®). In another example, the file destination address may be a web address of the Amazon S3® cloud storage web service. In another example, the file destination address may be the IP address of the client computing device 112 and the electronic file may be provided to the client computing device 112.

Referring now to FIG. 3, the Venn diagram 300 of the types of matches that may take place between two sets of raw customer data records and the master data records of the master data record repository 130 is shown, according to an example embodiment. As shown, ideal or first ranked matches take place when there is a matching data record from the first set of raw data, the second set of raw data, and the master data record repository 130. Likewise, as shown, unqualified matches may take place between all three data source, or even two of the data sources.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, the circuits of the processing circuit described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a lookup box, a search bar, an icon, one or more checkboxes, one or more radio buttons, a button, a toggle, a date field, a slider, and the like. Further, each "field" may include and/or receive data that is associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for querying one or more data records of a combined data repository comprising:
- receiving, by a provider computing system, a set of raw data records,
- wherein each data record of the set of raw data records includes a deidentified token;
- storing, by the provider computing system, the set of raw data records in a first repository;
- cleaning, by the provider computing system, the set of raw data records;
- modifying, by the provider computing system, each data record of the set of raw data records to replace the deidentified token with a Secure Multi-Party Computation (SMC) token;
- generating, by the provider computing system, a copy of a second data repository including a plurality of master data records, wherein the copy of the second data repository is isolated from the second data repository, and wherein the provider computing system is prevented from modifying the second data repository to include the set of raw data records;
- matching, by the provider computing system, the plurality of master data records of the copy of the second data repository with the set of modified data records to determine one or more matched master data records;
- storing, by the provider computing system, the set of modified data records and the one or more matched master data records in the combined data repository;
- receiving, by the provider computing system, a query including at least one configuration property;
- executing, by the provider computing system, the query on the combined data repository to select at least one data record stored in the combined data repository that matches the configuration property;
  - generating, by the provider computing system, an electronic file including the selected at least one data record; and
- outputting, by the provider computing system, the electronic file.

2. The method of claim 1, wherein the method further comprises:
- outputting, by the provider computing system, each deidentified token; and
- receiving, by the provider computing system, a plurality of deidentified token and associated SMC token pairs; and
- modifying, by the provider computing system, each data record of the set of raw data records to replace the deidentified token with a Secure Multi-Party Computation (SMC) token based on the plurality of deidentified token and associated SMC token pairs.

3. The method of claim 1, wherein the method further comprises:
- generating, by the provider computing system, an SMC token based on each deidentified token; and
- modifying, by the provider computing system, each data record of the set of raw data records to replace the deidentified token with the generated SMC token.

4. The method of claim 1, further comprising:
- classifying, by the provider computing system, the set of raw data records as a first category.

5. The method of claim 4, wherein the first category is a test results category, and wherein cleaning the set of raw data records comprises:
- modifying, by the provider computing system, each data record of the set of raw data records to match a test results data schema.

6. The method of claim 4, further comprising:
- modifying, by the provider computing system and in response to the set of raw data records being classified into the first category, each data record of the set of raw data records to add at least one field associated with the first category to each data record.

7. The method of claim 1, wherein each master data record includes a SMC token, and wherein the provider computing system determines one or more matched master data records in response to the SMC token of the one or more matched master data records being the same as the SMC token of at least one data record of the set of modified data records.

8. The method of claim 1, wherein each master data record includes a SMC token and a date of birth (DOB), wherein at least one data record of the set of modified data records includes a DOB, and wherein the provider computing system determines one or more matched master data records in response to:
- i) the SMC token of the one or more matched master data records being the same as the SMC token of the at least one data record of the set of modified data records, and
- ii) the DOB of the one or more matched master data records being the same as the DOB of the at least one data record of the set of modified data records.

9. The method of claim 1, wherein the copy of the second data repository is a temporary copy, and wherein the method further comprises:
- deleting, by the provider computing system and after storing the one or more matched master data records in the combined data repository, the temporary copy of the second data repository.

10. The method of claim 1, wherein the set of raw data records is a first set of raw data records, and wherein the method further comprises:
- receiving, by a provider computing system, a second set of raw data records,
- wherein each data record of the second set of raw data records include a deidentified token;
- storing, by the provider computing system, the second set of raw data records in the first repository;

cleaning, by the provider computing system, the second set of raw data records; and modifying, by the provider computing system, each data record of the second set of raw data records to replace the deidentified token with a Secure Multi-Party Computation (SMC) token, wherein the plurality of master data records of the copy of the second data repository are matched with the first set of modified data records and the second set of modified data records to determine the one or more matched master data records, and wherein the first set of modified data records, the second set of modified data records, and the one or more matched master data records are stored in the combined data repository.

11. A method for querying one or more data records of a combined data repository comprising:

receiving, by a provider computing system, a first set of raw data records and a second set of raw data records, wherein each data record of the first set of raw data records and the second set of raw data records includes a deidentified token;

storing, by the provider computing system, the first set of raw data records and the second set of raw data records in a first repository;

cleaning, by the provider computing system, the first set of raw data records;

cleaning, by the provider computing system, the second set of raw data records;

outputting, by the provider computing system, the cleaned first set and the cleaned second set of raw data records;

receiving, by the provider computing system, a modified first set of raw data records, wherein each data record of the modified first set of raw data records includes a Secure Multi-Party Computation (SMC) token in place of the deidentified token;

receiving, by the provider computing system, a modified second set of raw data records, wherein each data record of the modified second set of raw data records includes a Secure Multi-Party Computation (SMC) token in place of the deidentified token;

generating, by the provider computing system, a copy of a second data repository including a plurality of master data records, wherein the copy of the second data repository is isolated from the second data repository, and wherein the provider computing system is prevented from modifying the second data repository to include the first set of raw data records;

matching, by the provider computing system, the plurality of master data records of the copy of the second data repository with the modified first set of raw data records and the modified second set of raw data records to determine one or more matched master data records;

storing, by the provider computing system, the modified first set of raw data records, the modified second set of raw data records, and the one or more matched master data records in the combined data repository;

receiving, by the provider computing system, a query including at least one configuration property;

executing, by the provider computing system, the query on the combined data repository to select at least one data record stored in the combined data repository that matches the configuration property;

generating, by the provider computing system, an electronic file including the selected at least one data record; and outputting, by the provider computing system, the electronic file.

12. The method of claim 11, further comprising:

receiving, by the provider computing system, a private key; and outputting, by the provider computing system, the cleaned first set of raw data records, the cleaned second set of raw data records, and the private key.

13. The method of claim 11, further comprising:

classifying, by the provider computing system, the first set of raw data records as a first category; and classifying, by the provider computing system, the second set of raw data records as a second category.

14. The method of claim 13, wherein the first category is a test results category, and wherein cleaning the first set of raw data records comprises:

modifying, by the provider computing system, each data record of the first set of raw data records to match a test results data schema.

15. The method of claim 14, wherein the second category is a Specialty Pharmacy (SP) category, and wherein cleaning the second set of raw data records comprises:

modifying, by the provider computing system, each data record of the second set of raw data records to match a SP data schema.

16. The method of claim 13, further comprising:

modifying, by the provider computing system and in response to the first set of raw data records being classified into the first category, each data record of the first set of raw data records to add at least one field associated with the first category to each data record; and modifying, by the provider computing system and in response to the second set of raw data records being classified into the second category, each data record of the second set of raw data records to add at least one field associated with the second category to each data record.

17. The method of claim 11, wherein each master data record includes a SMC token, and wherein the provider computing system determines one or more matched master data records in response to the SMC token of the one or more matched master data records being the same as the SMC token of: at least one data record of the modified first set of raw data records or at least one data record of the modified second set of raw data records.

18. The method of claim 11, wherein each master data record includes a SMC token, and wherein the provider computing system determines one or more matched master data records in response to the SMC token of the one or more matched master data records being the same as the SMC token of: at least one data record of the modified first set of raw data records and at least one data record of the modified second set of raw data records.

19. The method of claim 11, wherein the copy of the second data repository is a temporary copy, and wherein the method further comprises:

deleting, by the provider computing system and after storing the one or more matched master data records in the combined data repository, the temporary copy of the second data repository.

20. The method of claim 11, wherein the configuration property is at least one of: a medical product code, a timeframe, a procedure code, a location, a health care provider (HCP) specialty, an age, or a gender.

* * * * *